United States Patent
Doi

(10) Patent No.: US 7,646,399 B2
(45) Date of Patent: Jan. 12, 2010

(54) IMAGING MODULE

(75) Inventor: Shunichiroh Doi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 530 days.

(21) Appl. No.: 11/452,918

(22) Filed: Jun. 15, 2006

(65) Prior Publication Data

US 2006/0284053 A1  Dec. 21, 2006

(30) Foreign Application Priority Data

Jun. 20, 2005  (JP) .............................. 2005-179377

(51) Int. Cl.
*H04N 7/14* (2006.01)
*H04Q 7/20* (2006.01)

(52) U.S. Cl. ................................. 348/14.01; 455/556.1
(58) Field of Classification Search ............. 348/14.01, 348/207.1, 231.7, 231.9, 312; 455/556.1–556.2, 455/557

See application file for complete search history.

(56) References Cited

U.S. PATENT DOCUMENTS

2003/0063207 A1* 4/2003 Noguchi et al. ............. 348/312

FOREIGN PATENT DOCUMENTS

| JP | 7-274057 | | 10/1995 |
| JP | 406268582 | * | 9/2004 |

* cited by examiner

*Primary Examiner*—Lee Nguyen
(74) *Attorney, Agent, or Firm*—McGinn IP Law Group, PLLC

(57) ABSTRACT

An imaging module is provided and includes: an imaging section that capturing an image of an object and outputs an image signal; a bus connected to the imaging means; a receiving section that receives the image signal through the bus; an image data generating section that generates an image data based on the image signal; and a transmitting section that transmits the image data through the bus. The receiving section received the image signal at a timing of one of rising and falling of a synchronizing clock, and the transmitting section transmits the image signal at a timing of the other of the rising and falling.

12 Claims, 1 Drawing Sheet

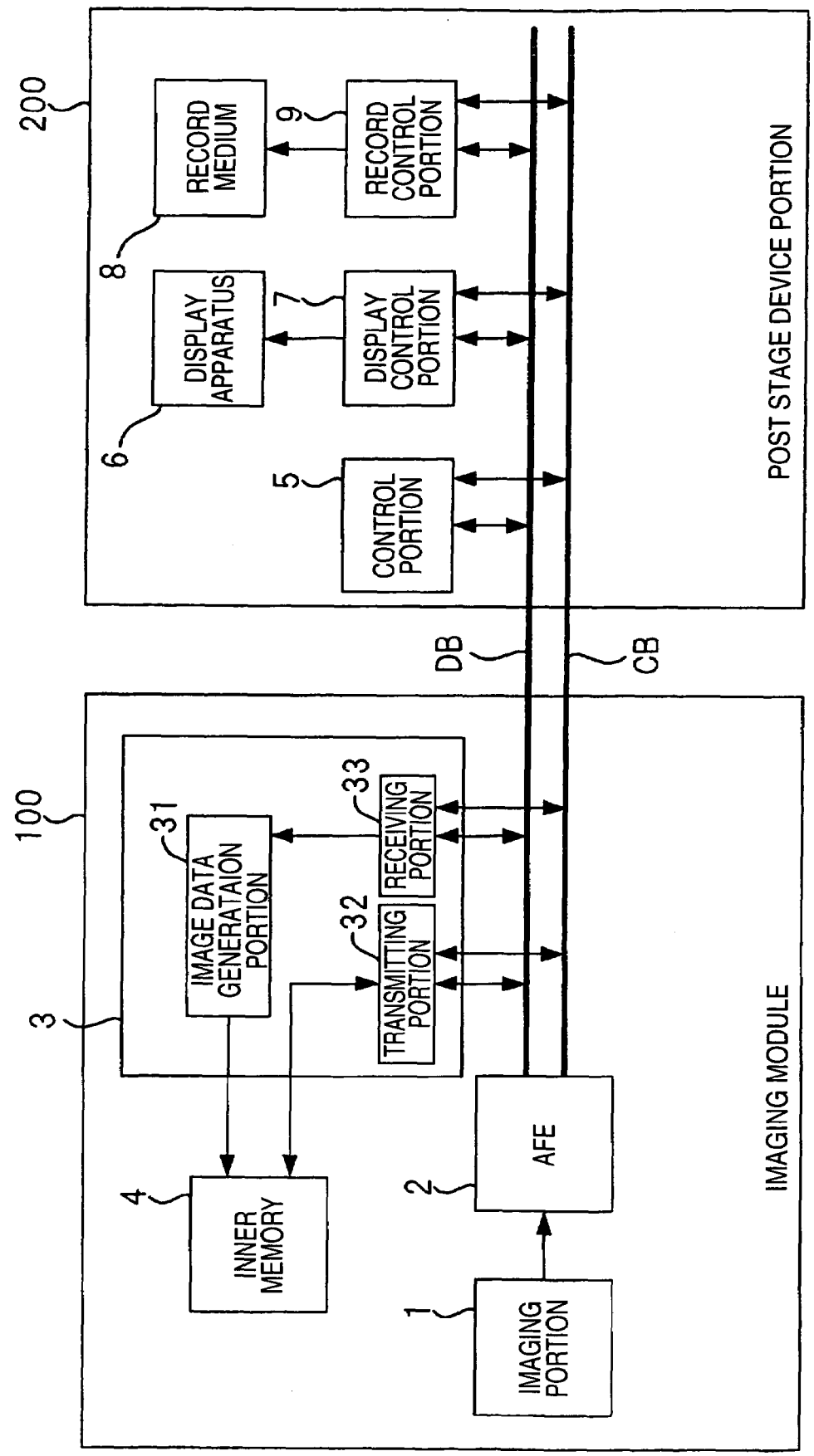

IMAGING MODULE

FIELD OF THE INVENTION

The invention relates to an imaging module mounted to an electronic apparatus of a cellular phone or the like.

BACKGROUND OF THE INVENTION

A currently spreading electronic apparatus attached with a camera includes, for example, an imaging module for generating an image data by capturing an image of an object, and a device for carrying out respective kinds of processings of receiving a data including the image data transmitted from the imaging module, generating an display image data to display a through image on a display portion, and compressing the image data and recording the compressed data in a record medium. In a background art, DSP (distal signal processor) included in an imaging module carries out processings of, for example, receiving an image signal from an image sensor through a path to generate an image data, and transmitting the generated image data to a device through a path different from the above-described path. Since it is necessary to increase a pin number (IO pad number) of DSP, the pin number is one of factors of hampering small-sized formation and low cost formation of the imaging module.

JP-A-7-274057 discloses a system including a video camera in correspondence with the above-described imaging module and an image input apparatus in correspondence with the above-described device.

SUMMARY OF THE INVENTION

An object of an illustrative, non-limiting embodiment of the invention is to provide an imaging module capable of realizing small-sized formation and low cost formation.

According to an exemplary embodiment of the invention, an imaging module includes: an imaging section for capturing an image of an object and outputting an image signal; a bus connected to the imaging section; a receiving section for receiving the image signal through the bus; an image data generating section for generating an image data based on the image signal received by the receiving section; and transmitting means for transmitting the image data generated by the image data generating section through the bus. Further, the receiving section receives the image signal at a timing of one of rising of a synchronizing clock and falling of the synchronizing clock, and the transmitting section transmits the image data at a timing of the other of the rising of the synchronizing clock and the falling of the synchronizing clock.

By the constitution, the bus in which the image signal flows and the bus in which the image data flows can be made to be common and therefore, small-sized formation and low cost formation can be achieved.

In an exemplary embodiment of the invention, the imaging section may stop outputting of the image signal during a time period in which the image data is transmitted by the transmitting section.

According to an exemplary embodiment of the invention, the imaging module capable of realizing small-sized formation and low cost formation can be provided.

BRIEF DESCRIPTION OF THE DRAWING

The sole FIGURE is a diagram showing an outline constitution of a cellular phone attached with a camera for explaining an exemplary embodiment of the invention.

DETAILED DESCRIPTION OF THE INVENTION

An exemplary embodiment of the invention will be explained in reference to the drawings as follows.

The figure is a diagram showing an outline constitution of a cellular phone attached with a camera for explaining an exemplary embodiment of the invention.

A cellular phone attached with a camera shown in the figure includes an imaging module 100 and a post stage portion 200 for carrying out various kinds of processings based on a data transmitted from the imaging module 100.

The imaging module 100 includes an imaging portion 1, an analog front end (AFE) 2, a digital signal processing portion 3, and an inner memory 4. AFE 2 and the digital signal processing portion 3 are connected to a data bus DB and a clock bus CB, and the data bus DB and the clock bus CB are connected also to the post stage device portion 200.

The imaging portion 1 captures an image of an object by an optical system of an imaging lens and the like and an imaging element of a CCD image sensor or the like and outputs an analog image signal. AFE 2 subjects the image signal provided by the imaging portion 1 to an analog signal processing and converts the processed analog signal into a digital signal. The imaging portion 1 and AFE 2 constitute an imaging section in the embodiment.

The digital signal processing portion 3 includes an image data generating portion 31, a transmitting portion 32, and a receiving portion 33. The digital signal processing portion 3 includes, for example, DSP.

The receiving portion 33 receives the image signal from AFE 2 through the data bus DB. The receiving portion 33 receives the image signal by latching the image signal at a timing of rising of a synchronizing clock flowing in the clock bus CB.

The image data generating portion 31 generates the image data (brightness/chrominance data) which is a data in a style capable of generating the image by carrying out various kinds of digital signal processings (black level correcting processing (OB processing), linear matrix correcting processing, white balance adjusting processing,. gamma correcting processing, synchronizing processing, and Y/C conversion processing and the like) in accordance with an operation mode. The image data generated by the image data generating portion 31 is temporarily recorded to the inner memory 4.

The transmitting portion 32 transmits the image data recorded to the inner memory 4 to the post stage device portion 200 through the data bus DB. The transmitting portion 32 transmits the image data at a timing of falling of the synchronizing clock flowing in the clock bus CB.

The post stage device portion 200 includes a control portion 5 for governing to control a total of the cellular phone attached with a camera, a display apparatus 6 of LCD or the like, a display control portion 7 for controlling display of the display apparatus 6, a record medium 8 of a memory card or the like, and a record control portion 9 for controlling record to the record medium 8. The display apparatus 6 is a display device for displaying the image captured by the imaging portion 1 as a through image, or displaying various kinds of information when the cellular phone attached with a camera is set to an imaging mode.

The control portion 5, the display control portion 7, and the record control portion 9 are respectively connected to the data bus DB and the clock bus CB.

An explanation will be given of operation of the cellular phone attached with a camera shown in the figure as follows.

When the cellular phone attached with a camera is set to the imaging mode capable of capturing an image, the image is started to be captured by the imaging portion 1. AFE 2 generates the symphonizing clock to output the synchronizing clock from the clock path CB and outputs the image signal at a timing capable of latching the image signal at the rising of the synchronizing clock. The receiving portion 33 receives the image signal outputted from AFE 2 at the timing of rising of the synchronizing clock. Further, the image data is generated by the image data generating portion 31 and the generated image data is recorded to the inner memory 4. The inner memory 4 is always recorded with two of the image data in an order of earlier image capturing time. On the other hand, the transmitting portion 32 reads the image data having the earliest image taking time recorded to the inner memory 4 and transmits the image data to the post stage device 200 at the timing of falling of the synchronizing clock. Further, AFE 2 stops the output of the image signal during a time period in which the transmitting portion 32 is transmitting the image data.

In the post stage device portion 200, for example, the through image is displayed on the display apparatus 6, or the image data is recorded to the record medium 9 by latching the image data at the timing of falling of the synchronizing clock by the display control portion 7 or the record control portion 8.

As described above, according to the cellular phone with a camera of the embodiment, by changing a communicating direction of the data bus DB at the timings of rising and falling of the synchronizing clock, AFE 2 and the digital signal processing portion 3 and the post stage device portion 200 can be connected by a common bus. Therefore, a pin number of the digital signal processing portion 3 can be reduced and a reduction in cost of the imaging module 100 can be expected. Further, different patterns of the bus can be made to be common and therefore, small-sized formation can also be expected.

Further, although in the above-described example, the receiving portion 33 receives the image signal at the timing of rising of the synchronizing clock, and the transmitting portion 32 transmits the image data at the timing of falling of the synchronizing clock, the receiving portion 33 may receive the image signal at the timing of falling of the synchronizing clock, and the transmitting portion 32 may transmit the image data at the timing of rising of the synchronizing clock.

Further, although according to the above-described example, AFE 2 controls and stops the bus by outputting the synchronizing clock, the digital signal processing portion 3 or the post stage device portion 200 may naturally control and stop the bus.

It will be apparent to those skilled in the art that various modifications and variations can be made to the described embodiments of the present invention without departing from the spirit or scope of the invention. Thus, it is intended that the present invention cover all modifications and variations of this consistent with the scope of the appended claims and their equivalents.

This application is based on Japanese Patent Application No. JP2005-179377, filed Jun. 20 of 2005, the contents of which is incorporated herein by reference.

What is claimed is:

1. An imaging module comprising;
    an imaging section that captures an image of an object and outputs an image signal as a digital signal;
    a digital signal processing portion including a receiving section, an image data generating section, and a transmitting section; and
    a bus connected to the imaging section, the digital signal processing section, and a post stage section,
    wherein the receiving section receives the image signal from the imaging section through the bus at a timing of one of rising and falling of a synchronizing clock,
    wherein the image data generating section that generates an image data based on the image signal, and
    wherein the transmitting section transmits the image data to the post stage section through the bus at a timing of the other of the rising and falling.

2. The imaging module according to claim 1, wherein the imaging section stops outputting of the image signal during a period in which the transmitting section transmits the image data.

3. The imaging module according to claim 1, wherein the bus comprises:
    a data bus that transports the image data; and
    a clock bus that transports the synchronizing clock.

4. A cellular phone with a camera, comprising:
    an imaging module according to claim 1; and
    a post stage section that carries out various processes based on a data transmitted from the imaging module.

5. The imaging module according to claim 1, wherein the imaging section further comprises:
    an imaging portion; and
    an analog front end connected to the imaging portion.

6. The imaging module according to claim 5, wherein the analog front end outputs the synchronizing clock.

7. The imaging module according to claim 1, further comprising:
    an inner memory,
    wherein the image data generating section sends image the data to the inner memory and the transmitting section receives the image data From the inner memory.

8. The imaging module according to claim 7, wherein the inner memory stores two of the image data in order of capturing time.

9. The imaging module according to claim 8, wherein the transmitting section reads the image data having an earliest capturing time.

10. The imaging module according to claim 1, wherein the imaging section comprises:
    an imaging lens;
    an imaging element connected to the imaging lens; and
    an analog to digital converting device connected to the imaging element.

11. The imaging module according to claim 1, wherein the post stage device outputs the synchronizing clock.

12. The imaging module according to claim 1, wherein the digital signal processing portion outputs the synchronizing clock.

* * * * *